(12) United States Patent
Barr

(10) Patent No.: US 9,302,383 B2
(45) Date of Patent: Apr. 5, 2016

(54) UTILITY TOOL DEVICE AND RELATED METHODS AND SYSTEMS

(71) Applicant: Caffeinate Labs, Inc., Somerville, MA (US)

(72) Inventor: Nathan G. Barr, Somerville, MA (US)

( * ) Notice: Subject to any disclaimer, the term of this patent is extended or adjusted under 35 U.S.C. 154(b) by 270 days.

(21) Appl. No.: 14/090,980

(22) Filed: Nov. 26, 2013

(65) Prior Publication Data

US 2014/0143958 A1    May 29, 2014

Related U.S. Application Data

(60) Provisional application No. 61/730,659, filed on Nov. 28, 2012, provisional application No. 61/800,388, filed on Mar. 15, 2013.

(51) Int. Cl.
*B25F 1/00* (2006.01)
*F16M 13/00* (2006.01)

(52) U.S. Cl.
CPC ............... *B25F 1/00* (2013.01); *F16M 13/00* (2013.01); *Y10T 29/49826* (2015.01)

(58) Field of Classification Search
CPC ............. B25F 1/00; A45F 5/00; G06F 1/16; F16M 13/00; Y10T 29/49826
USPC .............. 7/169, 138, 160, 164, 165, 158, 151
See application file for complete search history.

(56) References Cited

U.S. PATENT DOCUMENTS

| | | | | |
|---|---|---|---|---|
| D266,479 S | * | 10/1982 | Hayakawa | D8/17 |
| D302,514 S | * | 8/1989 | Gates | D8/105 |
| 5,516,072 A | * | 5/1996 | Shinno | A47G 1/142 248/174 |
| 8,056,871 B2 | * | 11/2011 | Matias | A47B 23/043 248/176.1 |
| D707,091 S | | 6/2014 | Barr | |
| 2011/0136555 A1 | * | 6/2011 | Ramies | B67B 7/16 455/575.8 |
| 2011/0253569 A1 | * | 10/2011 | Lord | B65D 25/20 206/320 |

OTHER PUBLICATIONS

Notice of Allowance for U.S. Appl. No. 29/450,200, mailed Feb. 26, 2014.

* cited by examiner

*Primary Examiner* — Hadi Shakeri
(74) *Attorney, Agent, or Firm* — Anne-Marie Dinius

(57) ABSTRACT

Disclosed are compact and portable devices comprising a combination of tools and that are shaped to facilitate being conveniently carried by a user in an unobtrusive manner.

17 Claims, 7 Drawing Sheets

UTILITY TOOL DEVICE AND RELATED METHODS AND SYSTEMS

RELATED APPLICATION(S)

This application claims priority to, and the benefit of, U.S. Provisional Application No. 61/730,659 filed Nov. 28, 2012 and U.S. Provisional Application No. 61/800,388, filed Mar. 15, 2013. The entire teachings of the above applications are incorporated herein by reference.

BACKGROUND OF THE INVENTION

Combination tools are commercially available; however, such tools are frequently large or bulky in nature, making them inconvenient for a user to carry. Due in part to their large or bulky size, users are often reluctant to carry the tool and as a result such tools are not readily available when needed.

While previous attempts have been made to develop miniaturized versions of combination tools, frequently such miniaturized tools are constructed of materials that are not suitable for withstanding the stresses typically placed on them when used for their intended purposes. For example, torque forces applied to such tools may cause them to bend, warp or even break, thereby negating the utility of such tools. As a result, such tools have been made suitably strong by designing them with a substantially thickened body, which renders such tool obtrusive to carry by discerning users.

Needed are combination or multi-function tools and devices that are capable of being easily carried unobtrusively by a user. Particularly needed are convenient, portable combination tools that can withstand forces that are typically applied to such tools during routine operation while resisting bending, warping or breaking. Preferably, such tools would afford a user with access to multiple tools in a compact and low profile design.

SUMMARY OF THE INVENTION

Disclosed herein is a device that provides a user with multiple tools and functions in a compact and easily portable design. The device disclosed herein is fabricated to withstand forces (e.g., torque forces) well in excess of those that are routinely applied during standard operation, while resisting plastic deformation and despite having a low profile (e.g., less than about 2.0 mm).

In one embodiment the present invention relates to a device that comprises a substantially flat body (e.g., a body that has the dimensions of, or similar to a credit card). The flat or substantially flat nature of the device disclosed herein renders such device easily portable (e.g., in a user's purse or wallet) and unobtrusive. The flat or substantially flat body of the device generally comprises a plurality of tools formed on or about such flat or substantially flat body. Such tools may be formed in the body of the device as one or more cutouts, apertures, contours and/or inscriptions. For example, in certain embodiments such tools may comprise one or more of a screwdriver (e.g., a slotted or Phillips screwdriver), a bottle cap opener, a wrench, a cutting apparatus, a lockout tool, a cord wrap tool and a ruler. In certain embodiments, the body of the device is irregularly shaped.

The device disclosed herein may comprise one or more screwdrivers (e.g., a screwdriver that is configured to turn a Phillips head screw or a metric M6 bolt) formed in the body of such device. For example, such a screwdriver may be a Phillips screwdriver (e.g., a two-dimensional Phillips screwdriver formed in the body of a device as an angled planar protrusion). In some embodiments, the screwdriver may be configured to turn a Phillips screw, for example, by including an angled planar protrusion. Similarly, the body of such device may comprise one or more Allen keys or wrenches that can be inserted into and turn a bolt or screw having a hexagonal depression.

In accordance with aspects of the present invention, the tools may comprise an optional cutting apparatus, such as a blade or a letter opener having an angled edge. In yet other embodiments, the tools may comprise one or more wrenches (e.g., a plurality of nested wrenches) that are configured to accommodate one or more hexagonal bolts of varying size.

The tools may further comprise one or more functional inscriptions, such as one or more rulers. In certain embodiments, such inscriptions may further comprise one or more labels or identifiers for each corresponding tool.

In accordance with aspects of the present invention, the tools and device disclosed herein are formed of a metal (e.g., stainless steel, ferromagnetic steel, other purpose steels, titanium or aluminum). Some such metals (e.g., a soft stamped metal) may be subjected to treatment (e.g., heating and quenching in oil to harden followed by tempering to reduce brittleness) to further strengthen such tools. Preferably, the tools may withstand at least about 1, 2.5, 5, 7.5, 10, 12.5, 15, 20, 25, 30, 40, 50 or more inch-pounds of torque (e.g., applied in-plane of the device body) despite the substantially flat configuration or profile of the device body.

In accordance with an embodiment, the device disclosed herein is substantially flat. The body of such device may have dimensions that are less than about the size of a standard credit card (e.g., a credit card that complies with the ISO/IEC 7810 ID-1 card size standard). For example, in some aspects the dimensions of the device body disclosed herein are less than about 85.60 mm×53.98 mm×0.76 mm, or less than about 107 mm×68 mm×1 mm, or less than about 107 mm×68 mm×1.5 mm, or less than about 107 mm×.68 mm×1.1 mm. In certain embodiments, the body of such device may have dimensions that are substantially similar to the size of a credit card (e.g., a credit card that complies with the ISO/IEC 7810 ID-1 card size standard).

The body of the device may further comprise one or more cutouts or apertures formed therein and configured to accept a supporting member (e.g., a credit card-sized or credit card-shaped supporting member) such that the supporting member and the body of the device are oriented substantially orthogonal to one another and, as a result, the device may be used as an easel to support one or more objects such as a mobile device (e.g., a cellular telephone, smartphone, personal digital assistant, mobile computing device, or tablet computer). For example, in certain embodiments, such a cutout or aperture comprises or consists of an undulating curvilinear elongate aperture passing through the body of the device. In certain implementations, such a cutout or aperture is configured to accept and frictionally engage a supporting member (e.g., an approximately credit card-sized supporting member). In such embodiments, preferably the difference between the height of such cutout or aperture and the thickness of the supporting member (e.g., a credit card) is great enough to position the center of mass of the mobile device behind the front pivot point, but less than the height at which the angle formed between the supporting member and the device body would exceed the angle at which a typical mobile device (e.g., an APPLE IPHONE), placed on its side on the supporting member (e.g., a credit card), will not overcome a force quantified by a coefficient of static friction between the mobile device and the supporting member.

Also provided herein is a method of supporting a mobile device using the device disclosed herein. Such method generally includes a step of providing the device of the present invention that has an elongate cutout or aperture (e.g., a sinusoidal cutout or an undulating curvilinear elongate aperture) passing therethrough. In certain aspects, such elongate cutout or aperture is configured to accept and frictionally engage an approximately credit card-sized supporting member (e.g., a standard credit card).

Also disclosed herein is a system for supporting a mobile device. Such system generally includes the device of the present invention and one or more supporting members, wherein the device has a substantially flat device body that includes an elongate cutout or aperture (e.g., a sinusoidal cutout or an undulating curvilinear elongate aperture) that is configured to accept and frictionally engage the one or more supporting members. Frictionally engaging the device body and the one or more supporting members forms a supporting stand, which may be conveniently used to support a mobile device.

The device disclosed herein may further include a torsion spring. Such a torsion spring may be configured to allow a user to clip the device onto personal items. Similarly, the device disclosed herein may be magnetized or further include one or more magnets. Such magnets may be used to affix the device to surfaces (e.g., a refrigerator) for convenient user access. In certain embodiments, the body of the device may be formed of a magnetized metal.

In accordance with aspects of the present invention, the device disclosed herein may be prepared in a bent configuration or slightly bent to accommodate additional functionality. For example, protrusions may be formed either in or out of the plane of the body of the device and such protrusions may be bent or shaped to achieve one or more desired functions (e.g., to function as a clip for storing valuables or currency). Similarly, the tools may comprise one or more rings to facilitate additional protrusions (e.g., a plurality of Allen-key wrench protrusions) or to simply attach the tool or device to a keychain for enhanced portability.

The above discussed and many other features and attendant advantages of the present invention will become better understood by reference to the following detailed description of the invention.

BRIEF DESCRIPTION OF THE DRAWINGS

As illustrated in FIG. 6, the supporting stand is capable of supporting a mobile device.

As illustrated in FIG. 7, the supporting stand is capable of supporting a mobile device.

DETAILED DESCRIPTION OF THE INVENTION

Provided herein is a multipurpose device formed from a substantially flat body 1, thereby making such device easily portable by a user. In addition to its portability, the device disclosed herein is characterized by its strength and durability and in particular, is able to withstand normal use conditions without bending, warping or otherwise breaking. Such characteristics are particularly surprising in view of the compact size (e.g., less than about 1-2 mm in thickness) and shapes of the device disclosed herein.

The present inventions relate to the discovery that materials typically employed to fabricate flat metal objects are not suitable to manufacture the device that is the subject of the present invention. While certain traditional materials (e.g., stainless steel, general purpose steel, or aluminum) may be suitable for constructing flat metal objects, such objects are not suitable for use as tools because of their inability to withstand normal forces without deforming. While harder metals such as carbon steel may be employed to construct the subject device, such metals cause significant damage to the machinery, tooling or equipment (e.g., punches, stamps and dies) used to manufacture such device. For example, such metals often damage the metal stamps and dies that are used to manufacture the subject device. More expensive materials (e.g., titanium) are not suitable, as the cost of the final product would exceed the optimal market price point.

To overcome such challenges, the device disclosed herein is constructed of metals (e.g., stainless steel such as Grade 410), and subsequently exposed to further heat treatment to strengthen such device and the one or more tools comprised therein. For example, to further strengthen such device selected metals may be subjected to heating and quenching in oil to harden such metals followed by tempering to reduce brittleness. Such manufacturing processes impart increased strength and durability to the device disclosed herein. For example, in certain embodiments the device disclosed herein has dimensions that are smaller than, or similar to the size of a standard or traditional credit card (e.g., less than approximately 85.60 mm×53.98 mm×1.5, or less than approximately 85.60 mm×. 53.98 mm 0.76 mm), yet are able to withstand at least about 1, 2, 2.5, 3, 5, 7.5, 10, 12.5, 15, 20, 25, 30, 35, 40, 45, 50 or more inch-pounds of torque. As a result, the subject device is portable and is of sufficient strength and durability to withstand normal use without deforming.

Figure 1:
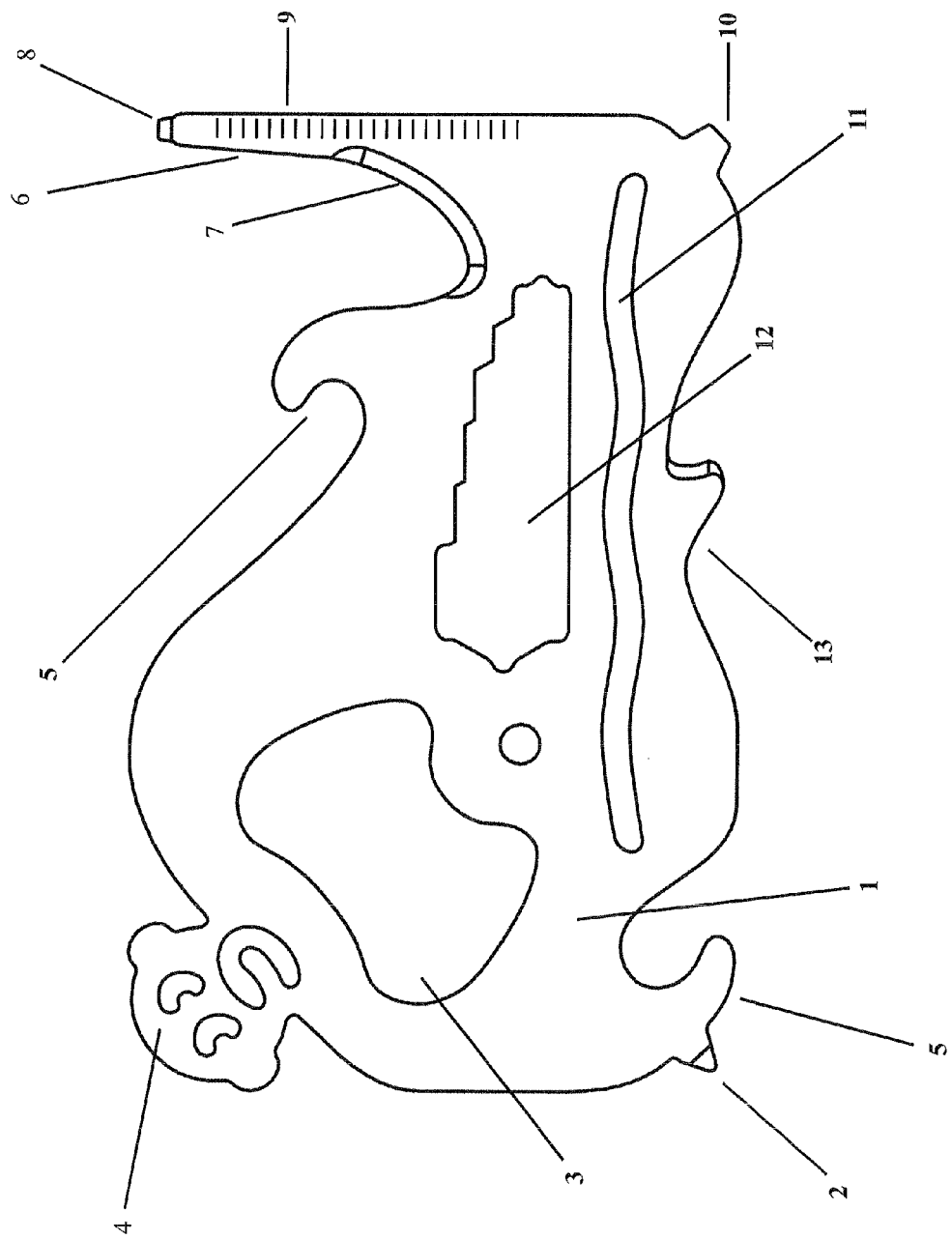
FIG. 1 illustrates a front view of one embodiment of the tool device.
Figure 2:
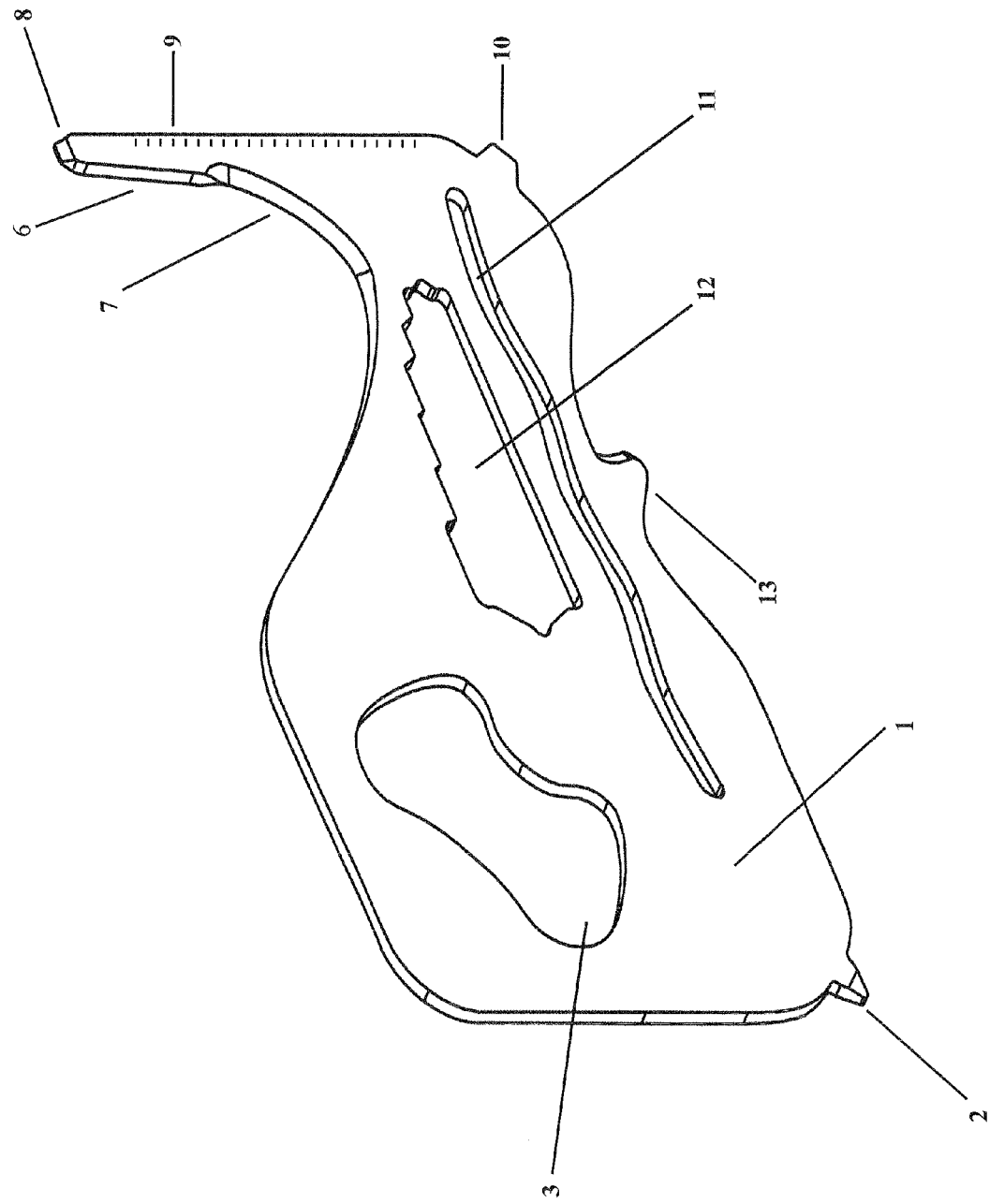
FIG. 2 illustrates a perspective view of one embodiment of the tool device.
Figure 3:
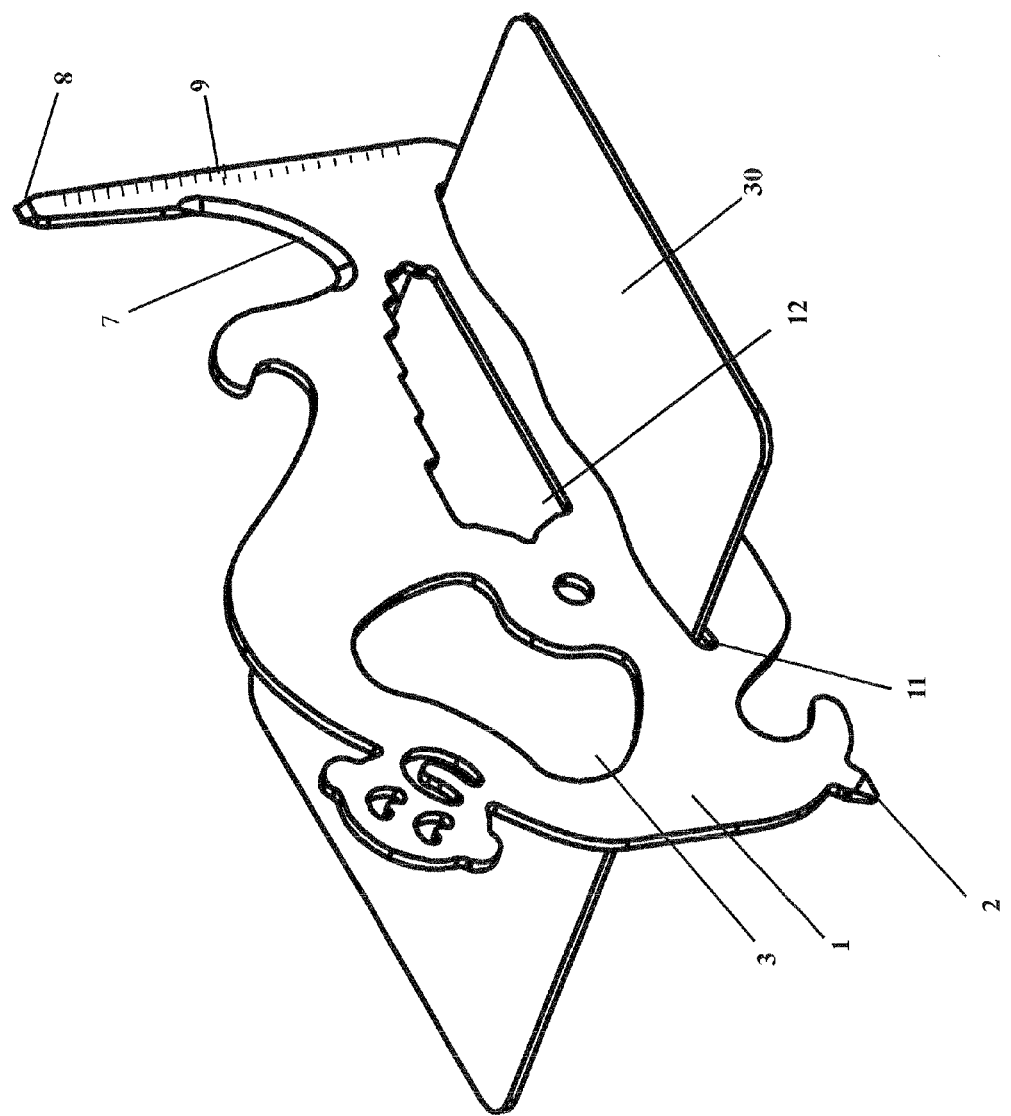
FIG. 3 depicts a perspective view of one embodiment of the tool device frictionally engaged with a credit card-sized supporting member to form a supporting stand.
Figure 4:
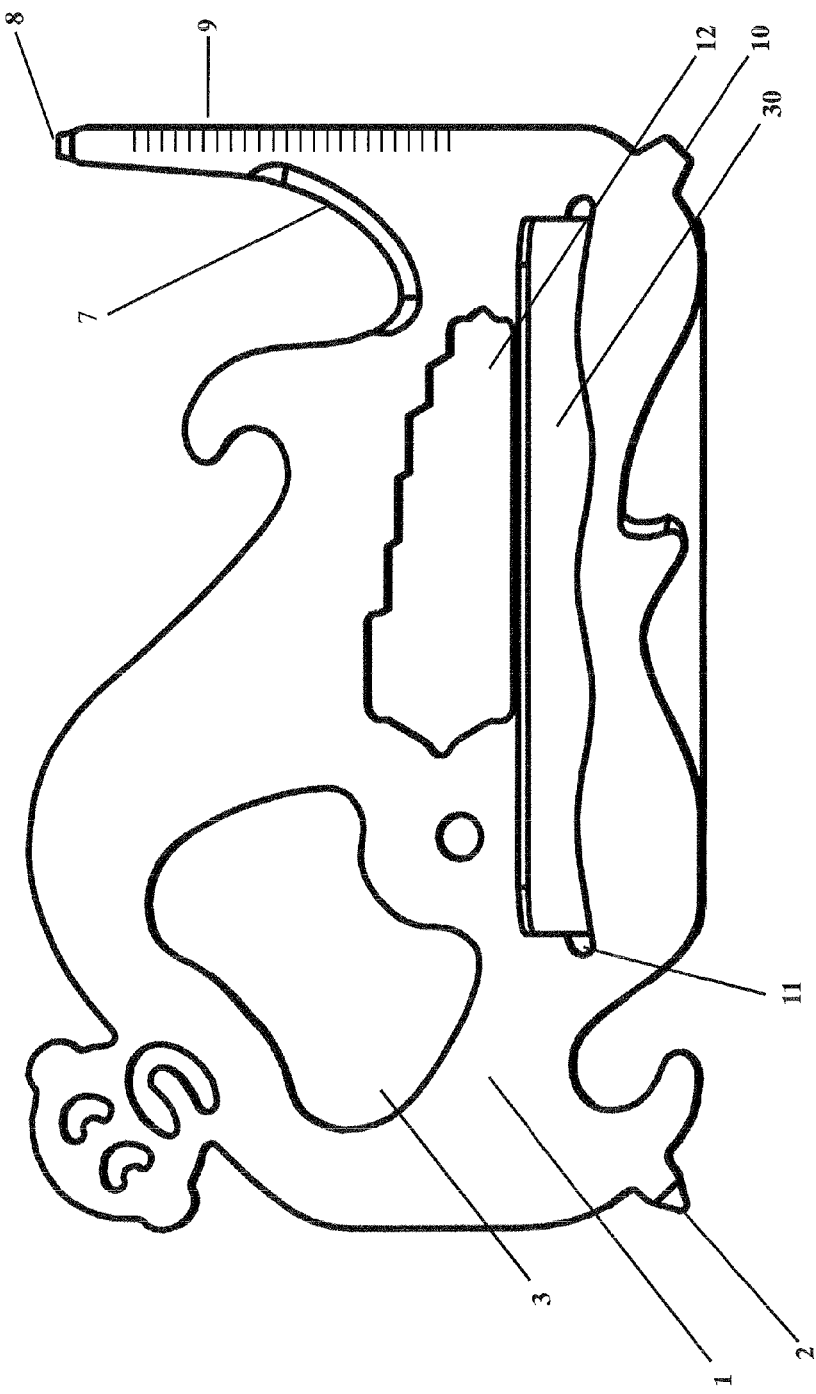
FIG. 4 depicts a front view of one embodiment of the tool device frictionally engaged with a credit card-sized supporting member to form a supporting stand.

FIGS. 1 and 2, wherein like parts are designated by like reference numerals throughout, illustrate example embodiments of the device. Although the present invention will be described with reference to the example embodiments illustrated in the figures, it should be understood that many alternative forms can embody the present invention. One of skill in the art will additionally appreciate different ways to alter the parameters of the embodiments disclosed, such as the size, shape, or type of elements or materials, in a manner still in keeping with the spirit and scope of the present invention.

Directing attention to FIGS. 1 through 7, illustrated are exemplary embodiments of the subject device. The body of the device is designated 1, and as illustrated in each of FIGS. 1 through 7, the body 1 is substantially flat. As used herein with reference to a device, the term "substantially flat" generally means that the body 1 of such device is planar, but may include one or more minor non-planar areas or protrusions (e.g., to impart certain functionality to the device or one or more tools comprised therein). For example, in certain embodiments, the body of the device 1 disclosed herein may be planar, with the exception of a screwdriver tool 2 comprising an angled planar or non-planar protrusion formed in the body 1 of the device. In some embodiments, such an angled planar or non-planar protrusion may enhance the ability of such a screwdriver tool 2 to turn a Phillips-head screw. Similarly, in other embodiments, the device disclosed herein may be prepared in a slightly bent configuration to accommodate additional functionality, such as a clip for storing valuables or currency. Preferably, such non-planar areas or protrusions are unobtrusive, do not render the device obtrusive and do not diminish the portability of the device (e.g., the portability of the device in a wallet or purse of a user). For example, in certain embodiments such non-planar areas or protrusions maintain the low profile nature of the device, such that the body 1 of the device remains less than about 1.0 mm, 1.25 mm, 1.5 mm, 1.75 mm, 2.0 mm, 2.25 mm, 2.5 mm, 2.75 mm, 3.0 mm, 3.25 mm, 3.5 mm, 3.75 mm or 4.0 mm in thickness.

The bodies 1 of the depicted devices comprise a plurality of tools formed therein. In certain embodiments, one or more of such tools are formed by cutouts or apertures. As used herein to describe one or more tools, the terms "cutout" and "aperture" generally refer to a structure (e.g., a structure formed by the negative space of the cutout or aperture) that is made in or about the body 1 of the device, for example by cutting or otherwise removing a portion of the device body 1 to form the structure (e.g. a tool structure). In certain embodiments, the actual tool structure (e.g., nested wrenches 12 or a bottle cap opener 3) is formed by the negative space of the cutout or aperture in the body 1 of the device. Directing attention to FIGS. 1 and 2, a bottle cap opener 3, an elongate undulating curvilinear elongate slot or aperture 11 configured to accept and frictionally engage a supporting member (e.g., a credit card-sized supporting member), and a series of nested wrenches 12 are each depicted as cutouts in the body 1 of the device.

In accordance with the present invention, the device described herein may comprise one or more whimsical caricatures 4 or shapes that resemble the likeness of, for example, an animal (e.g., a monkey) or an animated caricature (e.g., a ninja). Alternatively, such caricatures 4 may be substituted with a logo (e.g., a corporate logo) or other promotional designation.

As illustrated in each of FIGS. 1 and 2, the device described herein may comprise one or more screwdrivers 2, 8 and 10. Such screwdrivers may be slotted (e.g., a micro-sized slotted screwdriver) or a Phillips screwdriver. For example, in certain embodiments, such a screwdriver (e.g., a screwdriver 2 capable of turning a Phillips-head screw) may comprise an angled planar protrusion. Other contemplated tools include one or more protrusion 5 for wrapping a cord (e.g., an electrical cord), a lockout tool 6 useful for opening locked doors, one or more cutting apparatuses, such as a letter opener 7, and a peeler 13 (e.g., a fruit peeler). In view of the substantially flat shape of the device disclosed herein, such device is capable of placement in small areas, therefore making it particularly suitable for use, for example, as a letter opener or a lockout tool. The device may further comprise one or more functional inscriptions, such as for example, a ruler 9.

In accordance with the present invention, the device disclosed herein may comprise one or more Allen key or hex wrenches or protrusions that are suitable for turning a screw or bolt having a hexagonal depression or slot.

The device disclosed herein may further be configured as a supporting stand, for example to support a mobile device. As used herein, the phrase "supporting stand" generally refers to an easel-like support or stand that is capable of supporting a mobile device and that is formed by configuring or coupling the device of the present invention with one or more supporting members 30 (e.g., a credit card). Accordingly, the device disclosed herein may be configured to accept (e.g., slidably accept or frictionally accept) a supporting member 30 (e.g., a credit card) in an elongate cutout, slot or aperture 11, as illustrated, for example in FIGS. 3 through 7. Such elongate cutout, slot or aperture 11 may comprise one or more planar protrusions and wherein such planar protrusions facilitate or otherwise enhance the ability of the elongate cutout, slot or aperture 11 to frictionally engage the supporting member 30. Such planar protrusions may extend or protrude into the negative space formed by the elongate cutout or aperture to increase the contact area that such planar protrusion has with a supporting member introduced through such elongate cutout or aperture. For example, the body 1 of the device disclosed herein may comprise a sinusoidal or wave-like elongate cutout, slot or aperture having protrusions (e.g., one or more planar "peaks" or "troughs" of a sinusoidal elongate aperture extending into the negative space of such an elongate aperture) capable of frictionally engaging a supporting member 30 that is passed therethrough. Similarly, in certain embodiments, the body 1 of the device disclosed herein may comprise an undulating curvilinear elongate aperture, slot or cutout 11 having planar protrusions (e.g., one or more planar "peaks" or "troughs" of such undulating curvilinear elongate cutout, slot or aperture) capable of frictionally engaging a supporting member 30 that is passed therethrough.

It should be understood that while the present invention as disclosed herein can make use of a sinusoidal or an undulating curvilinear elongate aperture 11 passing through the body 1 of the device, the shape of such aperture is not limited to the specific illustrative examples described herein. Rather, the apertures and cutouts of the present invention may be designed to assume various shapes to frictionally engage a supporting member 30. For example, the device body 1 may include an elongate cutout or aperture having one or more planar notches, projections or protrusions to facilitate the frictional engagement of the supporting member 30. The elongate aperture may include one or more pointed, jagged, square-like, step-like, saw-toothed, saw-like or serrated planar projections to facilitate or enhance the frictional engagement of the supporting member 30. For example, such an elongate aperture may include a pattern of repeating planar projections that are capable of contacting and frictionally engaging a supporting member (e.g., a credit card-shaped supporting member). Such planar projections frictionally engage a supporting member 30 in a position substantially orthogonal to the body 1 of the device. As used herein with respect to the orientation of the device body 1 and the supporting member 30, the term "substantially" generally refers to ranges within about within ten percent.

Figure 5:
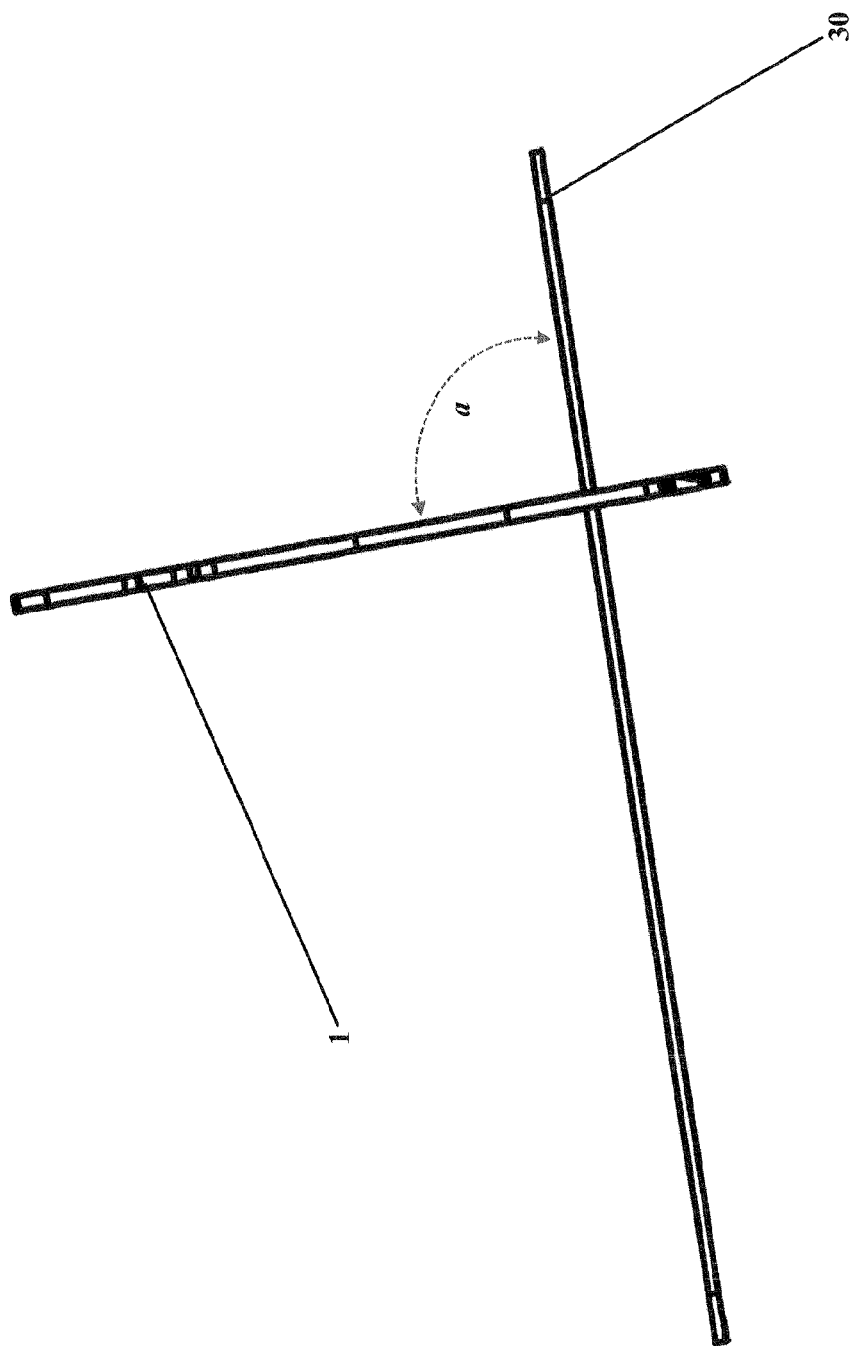
FIG. 5 depicts a side view of one embodiment of the tool device frictionally engaged with a credit card-sized supporting member to form a supporting stand. The device body and supporting member are oriented at an angle a, at which such device body and supporting stand are substantially orthogonal to one another.
Figure 6:
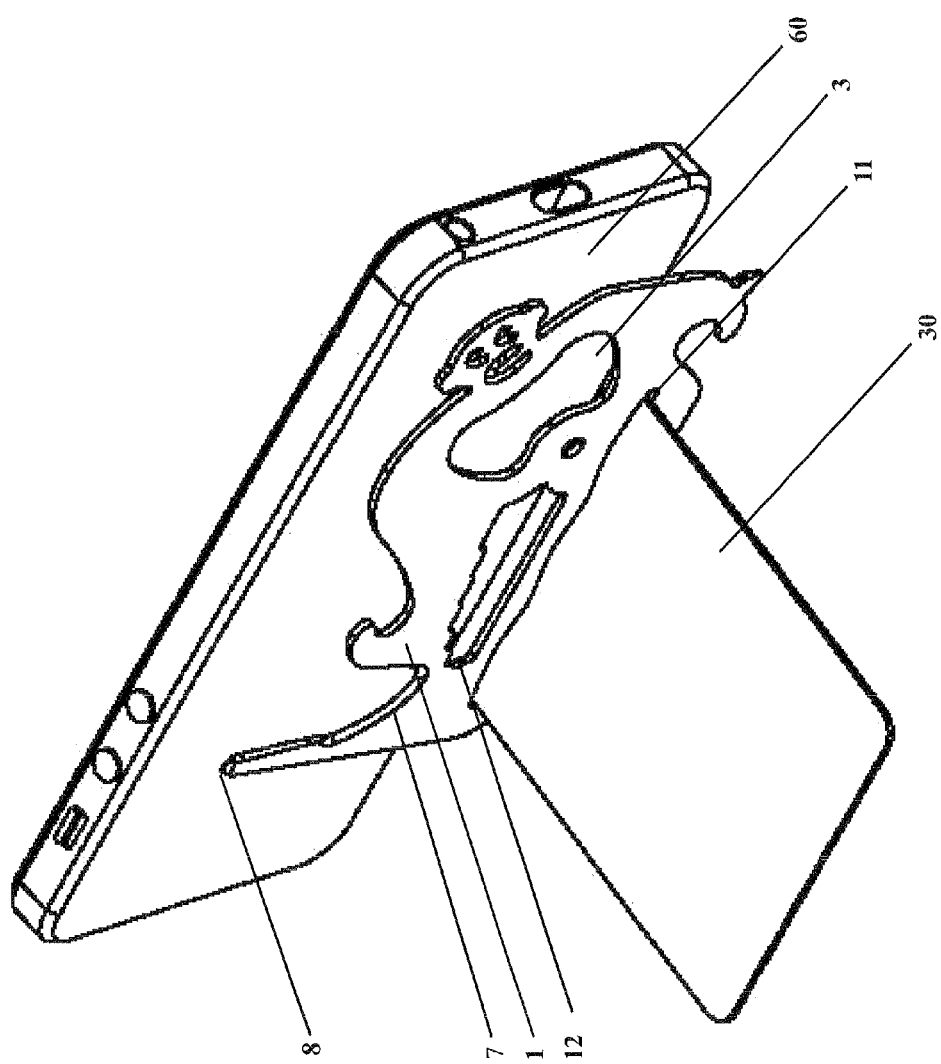
FIG. 6 illustrates a perspective view from the back of one embodiment of the tool device frictionally engaged with a credit card-sized supporting member to form a supporting stand.
Figure 7:
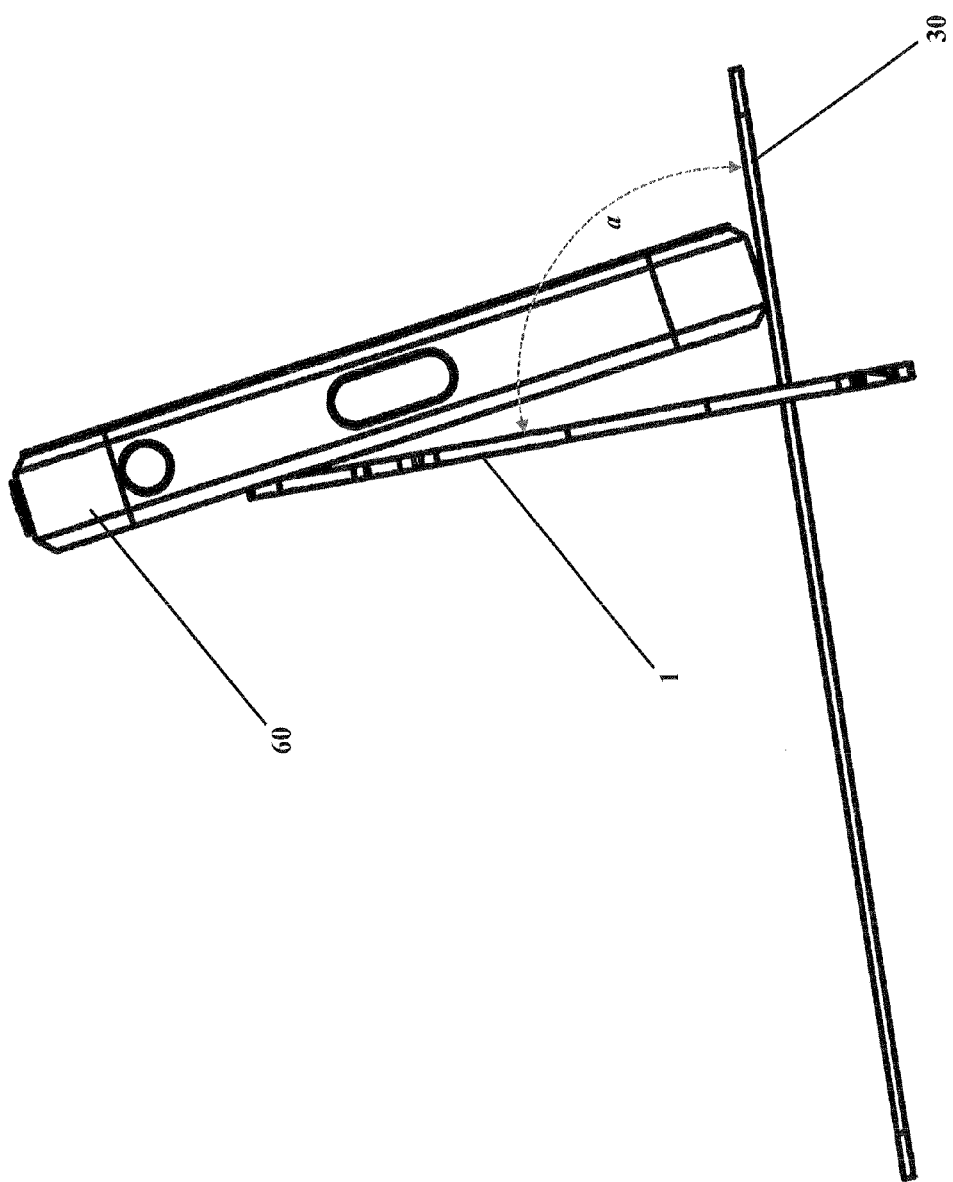
FIG. 7 depicts a side view of one embodiment of the tool device frictionally engaged with a credit card-sized supporting member to form a supporting stand. The device body and supporting member are oriented at an angle a, at which such device body and supporting member are substantially orthogonal to one another.

With reference to FIGS. 3 through 7, when coupled or configured with such a supporting member 30 (e.g., a credit card-sized supporting member) inserted partially through the aperture 11 in the body 1 of the device, the resulting supporting stand may be used to support a mobile device 60. As illustrated in FIGS. 5 and 7, the body 1 of the device includes an aperture (e.g., an undulating curvilinear elongate aperture 11) that frictionally engages the supporting member 30 at an angle a, such that the supporting member 30 is substantially orthogonal to the substantially flat body 1 of the device, thus forming a supporting stand to support a mobile device 60. In accordance with aspects of the present invention, the difference between the height of the elongate cutout or aperture (e.g., the undulating curvilinear elongate aperture 11) and the thickness of the supporting member 30 (e.g., a credit card) can be great enough to position the center of mass of the mobile device behind the front pivot point, but less than the height at which the angle a formed between the supporting member 30 and the device body 1 would exceed the angle a at which a typical mobile device 60, placed on its side on the supporting member 30 (e.g., a credit card), will not overcome a force quantified by a coefficient of static friction between the mobile device 60 and the supporting member 30 (e.g., a credit card).

Accordingly, also provided herein are methods of supporting a mobile device 60 using the device disclosed herein. Such methods generally comprise a step of providing the device of the present invention that comprises an undulating curvilinear elongate aperture 11 passing therethrough and that is configured to accept and frictionally engage an approximately credit card-sized supporting member 30 (e.g., a standard credit card). As depicted for example in FIGS. 3 through 7, the supporting member 30 may be frictionally engaged with the undulating curvilinear elongate aperture 11 of the device body 1 such that the supporting member 30 and the device body 1 are oriented at an angle (e.g., angle a illustrated in FIGS. 5 and 7), such that the supporting member 30 and device body 1 are substantially orthogonal to one another, to thereby form a supporting stand. The mobile device 60 may be positioned or placed onto the supporting stand to thereby support such mobile device. In certain embodiments, orienting the supporting member 30 (e.g., a credit card) at an angle (e.g., with reference to FIGS. 5 and 7, angle a) greater than about 90° (e.g., at an angle a greater or equal to about 90°, 91°, 92°, 93°, 94°, 95°, 96°, 97°, 98° or 99°) relative to the device body 1 causes the undulating curvilinear elongate aperture 11 to further frictionally engage the supporting member 30. Additionally, in certain embodiments, orienting the supporting member 30 (e.g., a credit card) at an angle (e.g., with reference to FIGS. 5 and 7, angle a) greater than about 90° (e.g., at an angle a greater or equal to about 90°, 91°, 92°, 93°, 94°, 95°, 95°, 97°, 98°, 99°, 100°, 105°, 110°, 115°, 120°, 125°, 130°, 135°, 140°, 145°, 150°, 155°, 160°, or more) relative to the device body 1 may increase or otherwise enhance the extent to which the device body 1 frictionally engages the supporting member 30.

As used herein, the phrase "frictionally engage" generally means there is resistance to sliding the supporting member 30 through the elongate aperture, slot or cutout (e.g., an undulating curvilinear elongate aperture 11) of the device body 1 of the present invention. Such resistance causes the device body 1 and supporting member 30 to be physically coupled (e.g., coupled perpendicularly relative to each other), thereby forming a supporting stand. In those implementations where the supporting member 30 comprises a credit card, the raised lettering, numbers or other markings (e.g., a user's name or issuing institution, a credit card number and/or an expiration date) found on such credit card may also contribute to or otherwise facilitate the frictional engagement of such credit card by the elongate aperture or cutout (e.g., the undulating curvilinear elongate aperture 11).

Also disclosed herein are systems for supporting a mobile device. Such systems generally comprise the device of the present invention and one or more supporting members 30, wherein the device includes a substantially flat device body 1 that comprises an elongate cutout or aperture (e.g., undulating curvilinear elongate aperture 11) that is configured to accept and frictionally engage the one or more supporting members 30. Frictionally engaging the device body 1 and the one or more supporting members 30 forms a supporting stand, which may be conveniently used to support a mobile device.

The articles "a" and "an" as used herein in the specification and in the claims, unless clearly indicated to the contrary, should be understood to include the plural referents. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention also includes embodiments in which more than one or the entire group members are present in, employed in or otherwise relevant to a given product or process. Furthermore, it is to be understood that the invention encompasses all variations, combinations, and permutations in which one or more limitations, elements, clauses, descriptive terms, etc., from one or more of the listed claims is introduced into another claim dependent on the same base claim (or, as relevant, any other claim) unless otherwise indicated or unless it would be evident to one of ordinary skill in the art that a contradiction or inconsistency would arise. Where elements are presented as lists, (e.g., in Markush group or similar format) it is to be understood that each subgroup of the elements is also disclosed, and any element(s) can be removed from the group. It should be understood that, in general, where the invention, or aspects of the invention, is/are referred to as comprising particular elements, features, etc., certain embodiments of the invention or aspects of the invention consist, or consist essentially of, such elements, features, etc. For purposes of simplicity those embodiments have not in every case been specifically set forth in so many words herein. It should also be understood that any embodiment or aspect of the invention can be explicitly excluded from the claims, regardless of whether the specific exclusion is recited in the specification. The entire contents of all of the references (including literature references, issued patents and published patent applications and websites) cited throughout this application are hereby expressly incorporated by reference.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

What is claimed is:
1. A device, comprising:
   a substantially flat body comprising two or more tools;
   wherein the two or more tools are formed in or on the body by one or more of cutouts, apertures, contours and inscriptions;

wherein the body further comprises an undulating curvilinear elongate aperture passing therethrough, the undulating curvilinear elongated aperture being approximately 53.98 mm long and configured to accept and frictionally engage with an approximately credit card-sized supporting member; and wherein the flat body is formed of a heat treated metal.

2. The device of claim 1, wherein the body is irregularly shaped.

3. The device of claim 2, wherein the undulating curvilinear elongate aperture has a height being approximately 0.76 mm.

4. The device of claim 3, wherein a difference between the height of the undulating curvilinear elongate aperture and a thickness of the supporting member is less than a height at which a mobile device supported by the supporting member will not overcome a force quantified by a coefficient of static friction between the device and the supporting member.

5. The device of claim 1, wherein the undulating curvilinear elongated aperture is configured to accept a supporting member comprising a credit card.

6. The device of claim 1, wherein the two or more tools are selected from the group consisting of a screwdriver, a micro screwdriver, a bottle cap opener, a wrench, a cutting apparatus, a lockout tool, a cord wrap tool, and a ruler.

7. The device of claim 6, wherein the cutting apparatus is selected from the group consisting of a blade, a peeler, and a letter opener.

8. The device of claim 1, wherein the two or more tools comprise a slotted screwdriver, a micro screwdriver, a Philips screwdriver, a bottle cap opener, a wrench, a cutting apparatus, a lockout tool, a cord wrap tool, a peeler, a letter opener or a ruler.

9. The device of claim 8, wherein the Philips screwdriver comprises an angled planar protrusion.

10. The device of claim 1, wherein the device is magnetic.

11. The device of claim 1, wherein dimensions of the device body is less than about 85.60 mm long and 53.98 mm wide.

12. A method of supporting a mobile device, the method comprising the steps of:
(i) providing a device, wherein the device comprises a substantially flat body comprising two or more tools, wherein the two or more tools are formed in or on the body by one or more of cutouts, apertures, contours and inscriptions, and wherein the body further comprises an undulating curvilinear elongate aperture passing therethrough and configured to accept and frictionally engage with a supporting member;
(ii) providing an approximately credit card-sized supporting member that is approximately 85.60 mm long by 53.98 mm wide;
(iii) providing a mobile device;
(iv) frictionally engaging the supporting member with the undulating curvilinear elongate aperture of the device such that the supporting member and the device body are oriented substantially orthogonal to one another to form a supporting stand; and
(v) positioning the mobile device onto the supporting stand to thereby support the mobile device.

13. The method of claim 12, wherein orienting the supporting member at an angle greater than 90° relative to the device body causes the device body to frictionally engage the supporting member.

14. The method of claim 13, wherein orienting the supporting member at an angle greater than 90° relative to the device body increases frictional engagement of the device body with the supporting member.

15. The method of claim 12, wherein the supporting member comprises a credit card.

16. A system for supporting a mobile device, the system comprising a device and one or more supporting members; wherein the device comprises a substantially flat device body, wherein the device body comprises two or more tools, wherein the two or more tools are formed in or on the device body by one or more of cutouts, apertures, contours and inscriptions, and wherein the device body further comprises an undulating curvilinear elongate aperture configured to accept and frictionally engage the one or more supporting members.

17. The system of claim 16, wherein the two or more tools are selected from the group consisting of a screwdriver, a micro screwdriver, a bottle cap opener, a wrench, a cutting apparatus, a lockout tool, a cord wrap tool, and a ruler.

* * * * *